United States Patent [19]

Scholz et al.

[11] Patent Number: 5,421,017
[45] Date of Patent: May 30, 1995

[54] REAL TIME CONTROL SYSTEM AND METHOD FOR REPLACING SOFTWARE IN A CONTROLLED SYSTEM

[75] Inventors: Stephan Scholz; Wolfgang Becker, both of Munich; Carl-Heinz Doellinger, Germering; Martin Wollensak, Munich, all of Germany

[73] Assignee: Siemens Aktiengesellschaft, Munich, Germany

[21] Appl. No.: 181,661

[22] Filed: Jan. 14, 1994

[30] Foreign Application Priority Data

Jan. 18, 1993 [DE] Germany ............... 9300562 U
Jul. 30, 1993 [EP] European Pat. Off. ........... 93112277

[51] Int. Cl.⁶ .................................................. G06F 9/06
[52] U.S. Cl. .......................... 395/700; 364/DIG. 1; 364/281.3
[58] Field of Search ............................ 395/200, 700

[56] References Cited

U.S. PATENT DOCUMENTS

| | | | |
|---|---|---|---|
| 4,954,941 | 9/1990 | Redman | 364/DIG. 1 |
| 5,008,814 | 4/1991 | Mathur | 395/200 |
| 5,155,837 | 10/1992 | Liu et al. | 364/DIG. 1 |

OTHER PUBLICATIONS

"Updating Software in a Real-Time Distributed System", Niang, Proceedings of the National Electronics Conference, vol. 38, 1984, pp. 57–60.

*Primary Examiner*—Thomas M. Heckler
*Attorney, Agent, or Firm*—Hill, Steadman & Simpson

[57] ABSTRACT

In order to save development costs, a real time control system should offer the possibility of being upgraded or of growing by replacing software during operation. This ability is achieved in that every message for communication contains a version identifier in addition to containing a designation of the addressed software unit that is unambiguous system-wide. This version identifier indicates the version of the addressed software unit to the operating system.

13 Claims, 4 Drawing Sheets

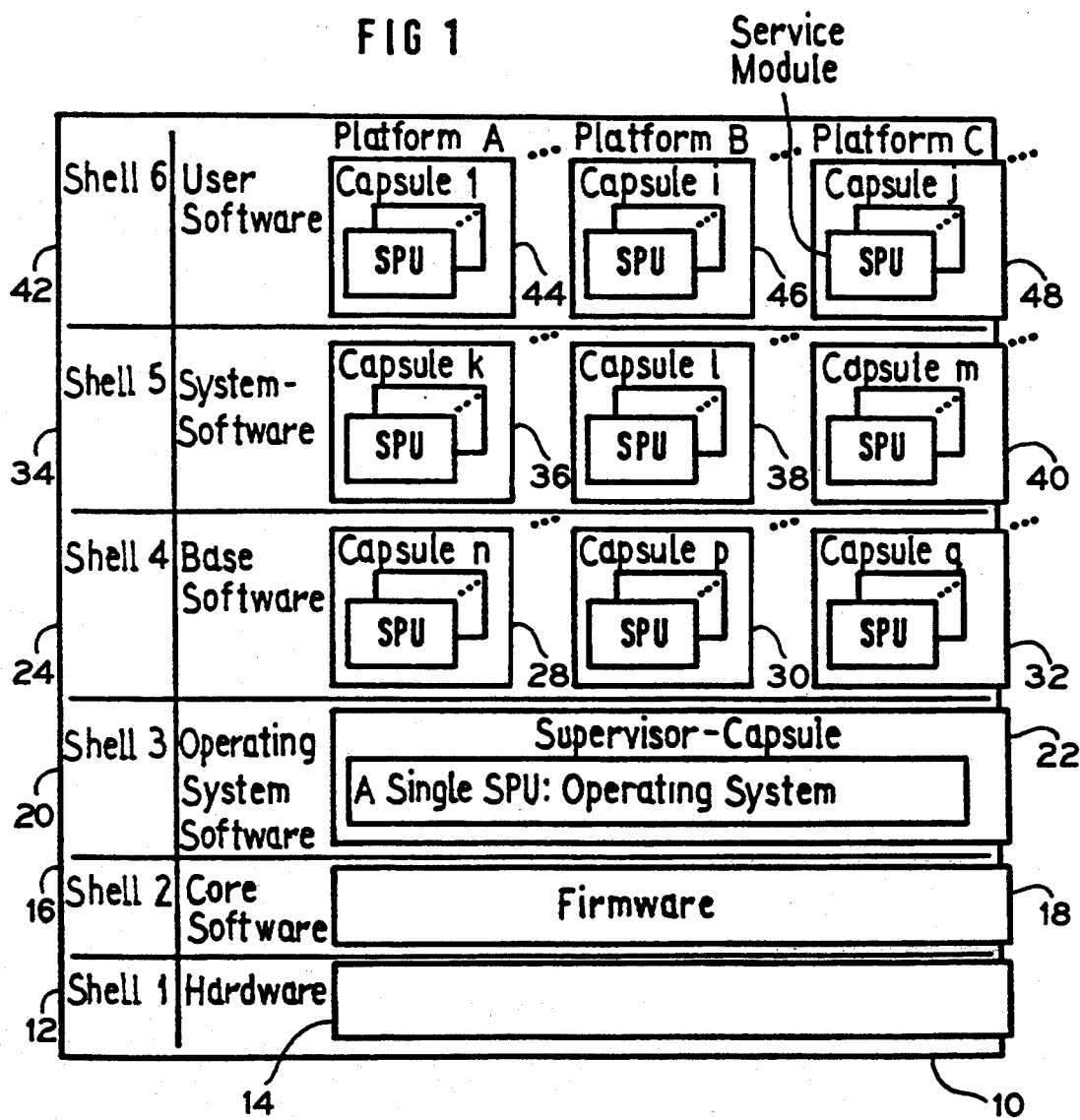

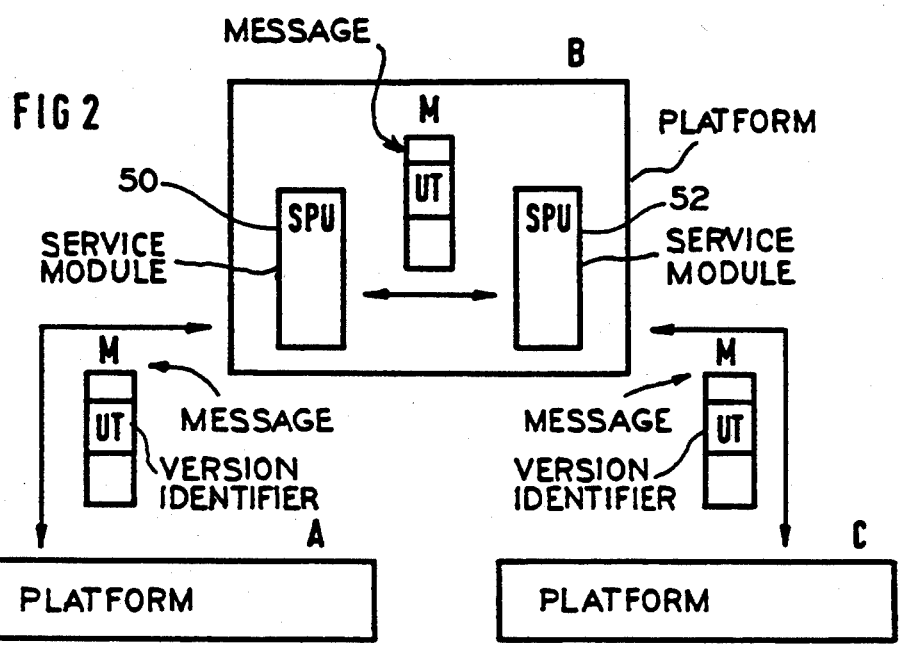
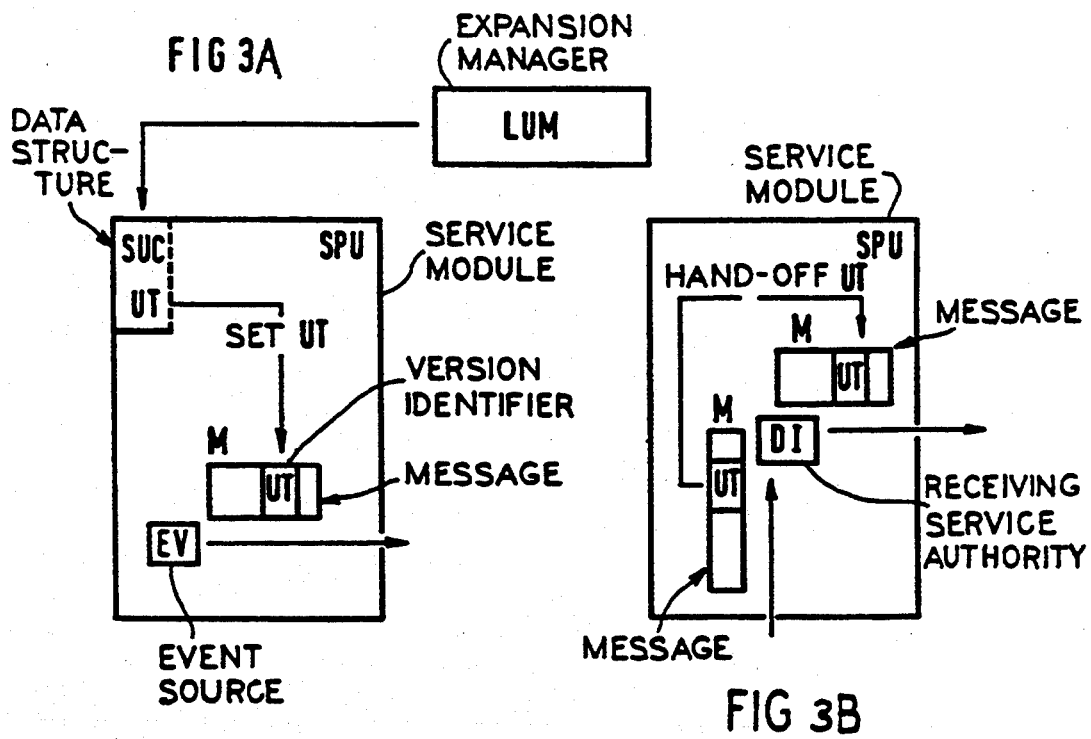

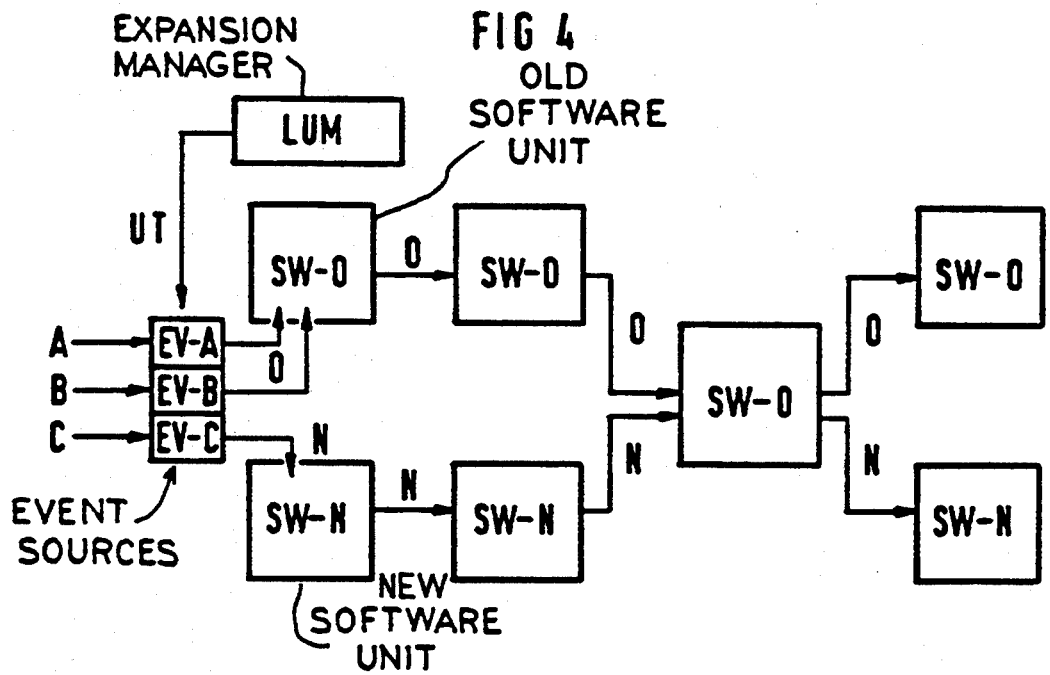

REAL TIME CONTROL SYSTEM AND METHOD FOR REPLACING SOFTWARE IN A CONTROLLED SYSTEM

BACKGROUND OF THE INVENTION

The upgrading or growth of the control system of exchanges by changing software during operation is one means of reducing development costs and thereby obtaining competitive advantages. Network operators can thus rapidly introduce new performance features with reduced logistics and without interrupting operations.

SUMMARY OF THE INVENTION

It is an object of the present invention to provide a control system that is flexible with respect to the exchange of software. It is a further object of the present invention to provide a method for replacing software in a control system during operation, that is, without interrupting operations.

In general terms the present invention is a real time control system comprising at least one control processor, a software system and an expansion manager. The software system is subdivided into an operating system and into a plurality of software units hierarchically lying thereabove which can be individually loaded into a main memory of the control processor. The software units communicate with one another via the operating system for the implementation of their control jobs on the basis of messages. Each message contains a version identifier, such as an upgrade token, in addition to a designation of the addressed software unit that is unambiguous system wide. The version identifier indicates the version of the addressed software unit to the operating system. The expansion manager within the software system informs the software units of the version identifier to be employed in a message.

The method of the present invention for replacing software in the control system has the following steps. A software unit of the new version is first loaded into the main memory of the control processor and is activated. The communication traffic is then switched to the newly loaded software unit without interruption in that the version identifier of the newly loaded software unit is communicated to the other software units of the software system. Finally, the old software unit is deactivated and the memory area with respect thereto is again released by the operating system.

In a further development of the present invention, the version identifier of the newly loaded software unit is communicated only to specific software units, namely to what are referred to as event sources that trigger actions of the control system as a consequence of an event in that they send source messages to other software units the version identifier for a sequential or string message is transferred into the sequential message from the message triggering the sequential message. As a result of this development, the communication outlay in the change-over phase of the communication traffic onto the newly loaded software unit is greatly reduced, since the communication of the new version identifier is limited only to the event sources.

In a further development of the present invention, the version identifier to be employed is communicated only once to the event sources by the expansion manager and is then sent to the operating system by the event sources themselves at every communication request. As a result of this development, the operating system has to note the version identifier event for a respective event source only during the change-over phase.

In a further development of the present invention an event source can be inhibited during the replacement phase of software. Due to this development, a message chain can be prevented from being initiated even though all software units provided for exchange for this message chain have not yet in fact been replaced, that is, loaded and activated.

In a further development of the present invention, the new version identifier can only be communicated to specific groups of event sources. Due to this development, a user can combine groups of events, what are referred to as message classes, and can switch only these in common.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts a model of processing platforms of the real time control system of the present invention;

FIG. 2 depicts the message exchange between two service modules via different platforms;

FIGS. 3A and 3B illustrates the combination of the concept of the version identifier with the concept of the event source;

FIG. 4 depicts the message flow through old and new software units, and

DESCRIPTION OF THE PREFERRED EMBODIMENT

Figure 5:
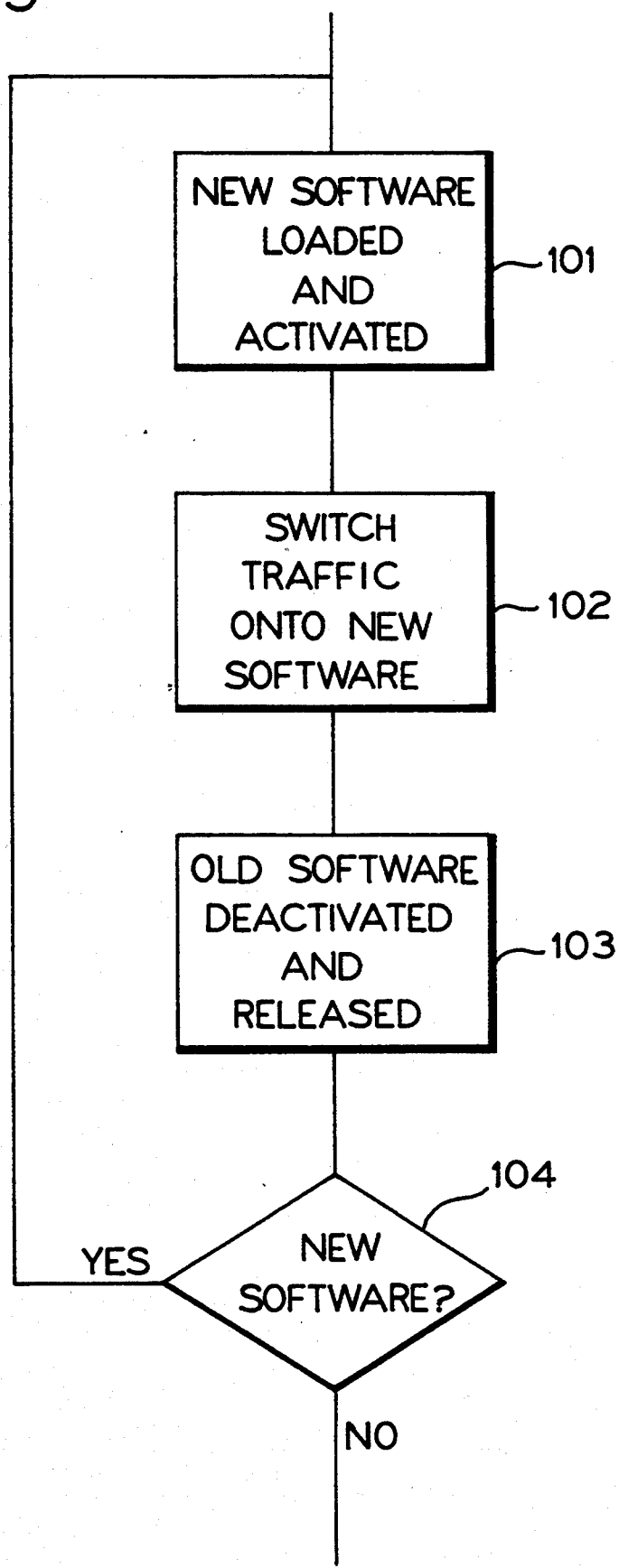
FIG. 5 is a flowchart depicting the method of the present invention.

FIG. 1 depicts a model of processing platforms of a control system 10 that has the following shells. A first shell 12 corresponds to the hardware 14 of the three processing platforms under consideration. A second shell 16 corresponds to the firmware 18 (initial program loader, hardware interface, error detection, etc.) of the processing platform. A third shell 20 corresponds to the operating system software 22 (operating system core, error treatment). A fourth shell 24 corresponds to the base software (database, overload controller, etc.) of the processing platform and has a plurality of software units referred to as capsules 28, 30, 32. A fifth shell 34 corresponds to the system software (configuration software with expansion manager of the present invention, recovery software, etc.) of the processing platform and also has a plurality of capsules 36, 38, 40. A sixth shell 42 corresponds to the user software (switching technology, user interface, protocol sequencing, etc.) of the processing platform and also has a plurality of capsules 44, 46, 48.

Only software sequencing above the second shell is combined in service modules SPU and capsules. Together, the shells 1–3 represent the basic processing platform and are the same for every processing platform type.

A service module has a number of process and data modules that have a highly functional relationship to one another and whose incarnations (service authorities) make a group of services available for the remaining software or for the subscribers of the switching system. The components (modules) of a service module are located in the same address space of the memory. Local procedure calls in common memory mechanisms can therefore be utilized for the communication within a service module.

A capsule has a group of service modules to which a specific allocation of operating means (for example, protected address space, timer) is made available in common. A capsule can be loaded into the memory of the control system and can be activated on-line, that is, without interrupting the operations of the operating system. The capsule thus represents a software unit that can be interchanged according to the method of the present invention.

The service module is a relocatable unit, that is, it can be moved from one capsule to another capsule and can likewise be moved from one processing platform to another processing platform at the production time of the control system. It follows therefrom that the interfaces of a service module must be defined by expressions (primitive expressions) of an inter-process communication (for example, CAST, remote procedures). Every action or every control data flow between two service modules is triggered by the interchange of messages. The communication between two service modules thus ensues exclusively via the operating system.

FIG. 2 shows the message exchange between two service modules 50,52 via platforms A, B and C. Each transmitted message M between different platforms (or within a platform between different service modules SPU) has a global message header (header). A specific part is reserved in this message header for a version identifier UT (upgrade token) that tells the operating system to which version of a software unit the corresponding message is to be transmitted.

Whenever a service authority of a service module wishes to establish a communication relationship to another service authority of another service module for the purpose of executing a service, then it carries out a corresponding call (communication request) to the operating system in which the name of the requested service type as well as further selection criteria are recited, among other things the aforementioned version identifier (upgrade token) UT.

As a result of the call, the calling service authority gets back what is referred to as a communication path (communication channel), by means of which the communication to the selected server service authority can be implemented. The actual communication is then carried out by sending messages or calls of remote procedures.

Every event that triggers a message between two service modules can be unambiguously specified as an external or internal event. An external event is a message of a third service module, whereas every other event is an internal event (for example, hardware interrupt). Software that sends out a message on the basis of an internal event is referred to below as event source.

Event sources occur within the control system, for example at the interfaces between two system layers, that is, at those locations where events are to be accepted by the software of a layer for the first time. An event source is that part of the software of a service module by which a hardware or software event is processed for the first time.

For example, an event can be represented by a subscriber picking up a telephone receiver. The message describing the event is then sent to an event source. Sequential or serial messages that are provided with a version identifier UT arise in the processing of the event by the event source. Which version identifier is to be employed is communicated to the event source by an expansion manager LUM.

This message is uniformly undertaken by the expansion manager within a software unit for all event sources that process a specific event type and is stored in a corresponding data structure of the software unit. Whether the actions or communications following an event of this event type are to be implemented the new software or the old software is determined by the version identified in the sequential messages.

By combining the concept of the version identifier with the concept of the event source, it is possible to switch between two software versions of a software unit without interrupting operations. This switching can be referred to as a soft cut-over and is carried out in the following way.

All event sources of the control system are successively switched-over, that is, software unit by software unit, in that the new version identifier of the newly introduced unit is respectively stored in corresponding data structures of the software units to be switched (event sources) (see FIGS. 3A and 3B). As a result thereof, messages due to new events now proceed only to the newly loaded software unit. Both versions of the software unit to be replaced remain simultaneously active during the switch-over event and can exchange data with one another, if necessary.

The duration of the switch-over event is selected such that the old software unit no longer receives messages from other software units of the control system after the end of the switch-over event and has thus become irrelevant for the rest of the control system. The old software unit to be replaced can then be deactivated and removed from the main memory without further consequences for the functionality of the control system.

FIGS. 3A and 3B illustrate the combination of the concept of the version identifier with the concept of the event source. In FIG. 3A, an expansion manager LUM of the system software (fifth shell) supplied a data structure SUC of a service module SPU with the current version identifier UT. An event source EV takes the corresponding, current version identifier UT from the data structure SUC due to an event and enters it into the message header of the source message ("set UT").

Further, FIG. 3B shows the hand-off of a version identifier into the message header of a sequential message due to an external event. The version identifier is thereby taken from the message header of the received message by a receiving service authority DI and is entered into the message header of the sequential message (hand-off UT).

FIG. 4 shows the message flow through old software units SW-O and new software units SW-N due to various events A, B and C. The events A, B and C are thereby received by event sources EV-A, EV-B and EV-C, whereby the event sources EV-A and EV-B have been informed of an old version identifier O by the expansion manager LUM, whereas the event source EV-C has had a new version identifier N communicated to it. As may be directly seen from FIG. 4, a communication chain can proceed via an old software unit despite a new version identifier N when this old software unit is not replaced by a new software unit.

An event that triggers a source message can be composed of various events. In such a case, that sub-event that arrives last defines the allocated version identifier for the source message. When, for example, a counter is incremented by various messages, then the version identifier in the message header of that source message that identifier the counter overflow defines the expansion identifier in the message header of the sequential messages.

Further, an event source can be inhibited during the expansion procedure in that the command (for example, MML command) belonging to the appertaining event is locked out. This possibility assures that specific event types need not be handled during the software exchange phase.

It is useful for some applications (for example, CCS7) to combine various messages or communication chains to form a message class (for example, maintenance class, application class). This message class can then be switched separately over to new software during a switch-over phase by a trigger of the expansion manager and can be referred to in this case as switch-over unit.

If the new software proves faulty, it is possible with the method of the present invention to immediately return soft, that is, without interrupting operations, to the old software. This is achieved in that the version identifier in such a case is in turn reset to the old value. As a result of this reset of the version identifier, the sequential messages of all event sources will again address the old software and the new software can thus be subsequently removed from the control system without interruption.

So far, service modules have been presented as software units to be switched-over. However, it is also possible to provide capsules as software units to be switched when capsules are likewise employed as software units to be exchanged.

In conclusion, the method realized on the basis of the software mechanisms which have been set forth can be described as follows: (see FIG. 5)

In the first step 101, a new software unit is loaded into the processor memory and is activated, whereby the incarnation (entitization) of the software modules contained in the software unit is to be understood as activation. After this step, the loaded software unit can be basically addressed by the entire software system. Since, however, all messages first reach only the old software unit due to the old version identifier, the services of the new software unit are at first not made use of.

In a second step 102, the switching of the communication traffic onto the new software unit now ensues. The switching of the communication traffic occurs, as already mentioned, in that the version identifiers of all event sources in the control system are set little-by-little without interrupting operations such that all messages then proceed only to the new software unit. Both versions of the software unit to be replaced are simultaneously active during the switch-over event.

In a third step 103, the old software unit is released by the memory management. Since the old software unit no longer receives messages from other software units after a specific time span, it has no significance for the rest of the control system after this time span . It can thus be released or eliminated without further consequences for the functionality of the control system.

In a fourth step 104, finally, the steps 1-3 are repeated with further software units until all desired, new software components have been introduced into the system.

A significant marginal condition for the method which has been set forth is the coexistence (compatibility) of new to old software, that is, the newly introduced software units must be able to cooperate with software units that continue to remain in the system. This condition may be graphically derived from FIG. 4.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. A real time control system comprising:
   at least one control processor having a main memory;
   a software system that is subdivided into an operating system and into a plurality of software units which have a hierarchical configuration and which are separately loadable into the main memory of the control processor and that communicate with one another via the operating system for the implementation of control jobs on the basis of messages;
   version identifiers and system wide unique identifiers for respective software units of said plurality of software units, each of said messages containing a version identifier and a system wide unique designation of a respective addressed software unit, said version identifier indicating a version of the addressed software unit to the operating system; and
   an expansion manager within the software system that supplies the software units of the plurality of software units with a respective version identifier to be employed in a respective message.

2. A method for replacing software in a control system having at least one control processor, having a software system that is subdivided into an operating system and into a plurality of software units which have a hierarchical configuration and which are separately loadable into a main memory of the control processor and that communicate with one another via the operating system for the implementation of control jobs on the basis of messages, each message containing a version identifier and a system wide unique designation of a respective addressed software unit said version identifier indicating a version of the addressed software unit to the operating system, and having an expansion manager within the software system that supplies the software units of the plurality of software units with a respective version identifier to be employed in a respective message, comprising the steps of:
   loading a respective software unit of a new version into a memory area of the main memory of the control processor and activating the respective software unit;
   switching messages from an old software unit of the plurality of software units to the newly loaded software unit, that replaces the old software unit, without interruption of the software system in that the version identifier of the newly loaded software unit is communicated to the other software units of the software system;

deactivating the old software unit and releasing by the operating system a memory area in the main memory associated with the old software unit.

3. The method according to claim 2, wherein the version identifier of the newly loaded software unit is communicated only to specific software units of the plurality of software units that are event sources which trigger actions of the control system as a consequence of an event in that the event sources send source messages to other software units of the plurality of software units; and wherein the version identifier for a sequential message is transferred into the sequential message from a message triggering the sequential message.

4. The method according to claim 3, wherein the version identifier to be employed is communicated to the event sources per a communication request.

5. The method according to claim 3, wherein the version identifier to be employed is communicated only once to the event sources by the expansion manager and is then sent to the operating system by the event sources at every communication request.

6. The method according to claim 5, wherein an event source is inhibited during a replacement phase of software.

7. The method according to claim 3, wherein the version identifier can only be communicated to specific groups of event sources.

8. The method according to claim 2, wherein the method further comprises:

after switching to the new software unit, carrying out a check to determine if the new software unit functions faultlessly;

given an identified fault of the new software unit, resetting the version identifier to be employed to an old value on the basis of renewed messages to the remaining software units; and deactivating, the new software unit and releasing the memory area relating thereto by the operating system.

9. A method for replacing software in a control system having at least one control processor having a software system that is subdivided into an operating system and into a plurality of software units which have a hierarchical configuration and which are separately loadable into a main memory of the control processor and that communicate with one another via the operating system for the implementation of control jobs on the basis of messages, each message containing a version identifier and a system wide unique designation of a respective addressed software unit said version identifier indicating a version of the addressed software unit to the operating system, and having an expansion manager within the software system that supplies the software units of the plurality of software units with a respective version identifier to be employed in a respective message, comprising the steps of:

loading a respective software unit of a new version into a memory area of the main memory of the control processor and activating the respective software unit;

switching messages from an old software unit of the plurality of software units to the newly loaded software unit without interruption of the software system in that the version identifier of the newly loaded software unit is communicated to specific software units of the plurality of software units that are event sources which trigger actions of the control system as a consequence of an event in that the event sources send source messages to other software units of the plurality of software units, the version identifier for a sequential message being transferred into the sequential message from a message triggering the sequential message;

carrying out a check to determine if the new software unit functions faultlessly;

given an identified fault of the new software unit, resetting the version identifier to be employed to an old value on the basis of renewed messages to the remaining software units and deactivating the new software unit and releasing the memory area relating thereto by the operating system, or given a faultlessly functioning new software unit, deactivating the old software unit and releasing by the operating system a memory area in the main memory associated with the old software unit.

10. The method according to claim 9, wherein the version identifier to be employed is communicated to the event sources per a communication request.

11. The method according to claim 9, wherein the version identifier to be employed is communicated only once to the event sources by the expansion manager and is then sent to the operating system by the event sources at every communication request.

12. The method according to claim 11, wherein an event source is inhibited during a replacement phase of software.

13. The method according to claim 9, wherein the version identifier can only be communicated to specific groups of event sources.

* * * * *